(12) United States Patent
Endo (10) Patent No.: US 10,279,797 B2
(45) Date of Patent: May 7, 2019

(54) CONTROL DEVICE FOR HYBRID VEHICLE AND CONTROL METHOD FOR HYBRID VEHICLE

(71) Applicant: Toyota Jidosha Kabushiki Kaisha, Toyota-shi Aichi-ken (JP)

(72) Inventor: Hiroki Endo, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 253 days.

(21) Appl. No.: 15/476,153

(22) Filed: Mar. 31, 2017

(65) Prior Publication Data

US 2017/0282892 A1 Oct. 5, 2017

(30) Foreign Application Priority Data

Apr. 5, 2016 (JP) ................................. 2016-075800

(51) Int. Cl.
| | |
|---|---|
| *B60W 20/10* | (2016.01) |
| *B60K 6/365* | (2007.10) |
| *B60W 30/18* | (2012.01) |
| *B60W 20/13* | (2016.01) |
| *B60L 7/16* | (2006.01) |
| *B60W 10/06* | (2006.01) |
| *B60W 10/08* | (2006.01) |
| *B60W 30/188* | (2012.01) |
| *B60W 50/04* | (2006.01) |
| *B60K 6/445* | (2007.10) |
| *B60W 50/00* | (2006.01) |

(52) U.S. Cl.
CPC ............. *B60W 20/10* (2013.01); *B60K 6/365* (2013.01); *B60K 6/445* (2013.01); *B60L 7/16* (2013.01); *B60W 10/06* (2013.01); *B60W 10/08* (2013.01); *B60W 20/13* (2016.01); *B60W 30/188* (2013.01); *B60W 30/18127* (2013.01); *B60W 50/04* (2013.01); *B60L 2210/30* (2013.01); *B60W 2050/0008* (2013.01); *B60W 2050/0088* (2013.01); *B60W 2510/0604* (2013.01); *B60W 2510/0642* (2013.01); *B60W 2710/06* (2013.01); *B60W 2710/065* (2013.01); *B60Y 2200/92* (2013.01); *B60Y 2300/182* (2013.01); *B60Y 2300/91* (2013.01); *Y02T 10/6239* (2013.01); *Y02T 10/6286* (2013.01); *Y02T 10/7241* (2013.01); *Y10S 903/903* (2013.01)

(58) Field of Classification Search
CPC .. B60W 20/10; B60W 30/18127; B60K 6/365
See application file for complete search history.

(56) References Cited

FOREIGN PATENT DOCUMENTS

JP 2009-274553 A 11/2009

*Primary Examiner* — Basil T. Jos
(74) *Attorney, Agent, or Firm* — Dinsmore & Shohl LLP (57) ABSTRACT

An electronic control unit performs a control process including a step of setting a second learning time shorter than a first learning time when a Charge Sustaining mode is not selected, a step of setting enlarged values as upper and lower limit values of a feedback value, a step of switching an engine stop prohibition flag to an ON state when a learning start condition is satisfied, a step of performing learning control, a step of performing an update process when the set learning time elapses, and a step of turning off the engine stop prohibition flag.

6 Claims, 7 Drawing Sheets

CONTROL DEVICE FOR HYBRID VEHICLE AND CONTROL METHOD FOR HYBRID VEHICLE

CROSS-REFERENCE TO RELATED APPLICATIONS

This application claims priority to Japanese Patent Application No. 2016-075800 filed on Apr. 5, 2016 which is incorporated herein by reference in its entirety including the specification, drawings and abstract.

BACKGROUND

1. Technical Field

The disclosure relates to a control device for a hybrid vehicle equipped with an engine and a rotary electrical machine and a control method for the hybrid vehicle.

2. Description of Related Art

In the related art, a hybrid vehicle equipped with an engine and a rotary electrical machine is known. In the engine with which the hybrid vehicle is equipped, feedback control for operating the engine in an appropriate state is performed. In order to improve precision of the feedback control, calculation of a learning value (calculation of the learning value is hereinafter referred to as learning) for correcting a deviation of a degree of control (such as a degree of control of a throttle opening level or a degree of control of an amount of fuel injected) of the feedback control of the engine on the basis of a result (a result value) of the control is performed during operation of the engine.

On the other hand, in a hybrid vehicle, an operation mode in which intermittent operation of an engine is allowed during travel may be selected for the purpose of improvement in fuel efficiency. At the time of intermittent stop of the engine, learning cannot be performed. Accordingly, there is demand for operation of the engine to enable the improvement in fuel efficiency and the performing of learning to be compatible depending on the selected operation mode.

For example, Japanese Patent Application Publication No. 2009-274553 (JP 2009-274553 A) discloses a technique of not permitting intermittent operation of an engine when fuel efficiency is not instructed to have priority by a fuel efficiency priority instruction switch and permitting the intermittent operation of the engine when fuel efficiency is instructed to have priority by the fuel efficiency priority instruction switch in a state in which learning of a degree of idle control is not completed.

SUMMARY

In JP 2009-274553 A, learning of a degree of feedback control is performed in the same way regardless of whether the intermittent operation of the engine is permitted. However, when the learning is performed in the same way regardless of whether the intermittent operation of the engine is permitted, the engine may not be stopped until the learning is completed. Accordingly, when the intermittent operation is requested by a user such as when the operation mode in which the intermittent operation (intermittent stop) of the engine is permitted is selected by the user, there is a possibility that the operating state of the engine will be maintained.

Such a problem can also be said to be caused when two operation modes having different degrees of permission of the intermittent operation of the engine are selectable by the user. For example, when one operation mode in which the intermittent operation of the engine is further permitted is selected but the same learning as when the other operation mode is selected is performed, there is a possibility that the operating state of the engine will be sustained until the learning is completed. As a result, there is a possibility of deterioration in fuel efficiency or deterioration in drivability.

The disclosure provides a technique of controlling an engine depending on an operation mode of a vehicle and appropriately calculating a learning value for correcting a deviation in a degree of control of feedback control of the engine.

A first aspect of the disclosure provides a control device for a hybrid vehicle. The hybrid vehicle includes an engine, a motor, and an electronic control unit. The motor is connected to a driving wheel. The electronic control unit is configured to control an output distribution of the engine and the motor including intermittent operation of the engine during travel of the vehicle and control operations of the engine and the motor in accordance with an operation command based on the output distribution. The output distribution is controlled by switching a plurality of modes. The plurality of modes include a first mode and a second mode, the first mode and the second mode are different from each other in at least one condition of an engine stop condition and an engine start condition for controlling the intermittent operation of the engine, and the at least one condition of the second mode is set such that a stop period of the engine in the second mode is longer than a stop period of the engine in the first mode. The electronic control unit is configured to calculate a first learning value when the engine is operated in the first mode. The first learning value is a learning value for correcting a deviation in a degree of control of feedback control of the engine using a first learning time. And the electronic control unit is configured to calculate a second learning value using a second learning time when the engine is operated in the second mode. The second learning time is shorter than the first learning time.

According to this configuration, the engine is likely to be stopped in the second mode. Accordingly, by calculating the second learning value using the second learning time shorter than the first learning time, it is possible to suppress the operating state of the engine from being maintained by the learning, for example, when the operating state of the engine is maintained until the learning is completed. As a result, it is possible to control the engine depending on the operation mode of the vehicle and to appropriately calculate the learning value.

In the control device, the electronic control unit may be configured to change at least one of an upper limit value and a lower limit value of the degree of control such that a change range of the degree of control when the engine is operated in the second mode is greater than a change range of the degree of control when the engine operates in the first mode.

When the second learning value is calculated using the second learning time shorter than the first learning time, precision of the calculated learning value may decrease. In this case, the degree of control may be changed during the feedback control. Accordingly, according to the above-mentioned configuration, it is possible to appropriately control the engine by enlarging the change range of the degree of control to correspond to the change of the degree of control. As a result, it is possible to suppress deterioration in drivability and deterioration in fuel efficiency.

In the control device, the electronic control unit may be configured to calculate the first learning value and the second learning value based on a throttle opening level of the engine.

A second aspect of the disclosure provides a control method for a hybrid vehicle. The hybrid vehicle includes an engine, a motor, and an electronic control unit. The motor is connected to a driving wheel. The control method comprising: controlling, by the electronic control unit, an output distribution of the engine and the motor including intermittent operation of the engine during travel of the vehicle, controlling, by the electronic control unit, operations of the engine and the motor in accordance with an operation command based on the output distribution, the output distribution is controlled by switching a plurality of modes, the plurality of modes include a first mode and a second mode, the first mode and the second mode are different from each other in at least one condition of an engine stop condition and an engine start condition for controlling the intermittent operation of the engine, and the at least one condition of the second mode is set such that a stop period of the engine in the second mode is longer than a stop period of the engine in the first mode; calculating, by the electronic control unit, a first learning value when the engine is operated in the first mode, the first learning value is a learning value for correcting a deviation in a degree of control of feedback control of the engine using a first learning time, and calculating, by the electronic control unit, a second learning value using a second learning time when the engine operates in the second mode, the second learning time being shorter than the first learning time.

According to this configuration, the engine is likely to be stopped in the second mode. Accordingly, by calculating the second learning value using the second learning time shorter than the first learning time, it is possible to suppress the operating state of the engine from being maintained by the learning, for example, when the operating state of the engine is maintained until the learning is completed. As a result, it is possible to control the engine depending on the operation mode of the vehicle and to appropriately calculate the learning value.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment will be described in detail with reference to the accompanying drawings. Like or corresponding elements in the drawings will be referenced by like reference numerals and description thereof will not be repeated.

Figure 1:
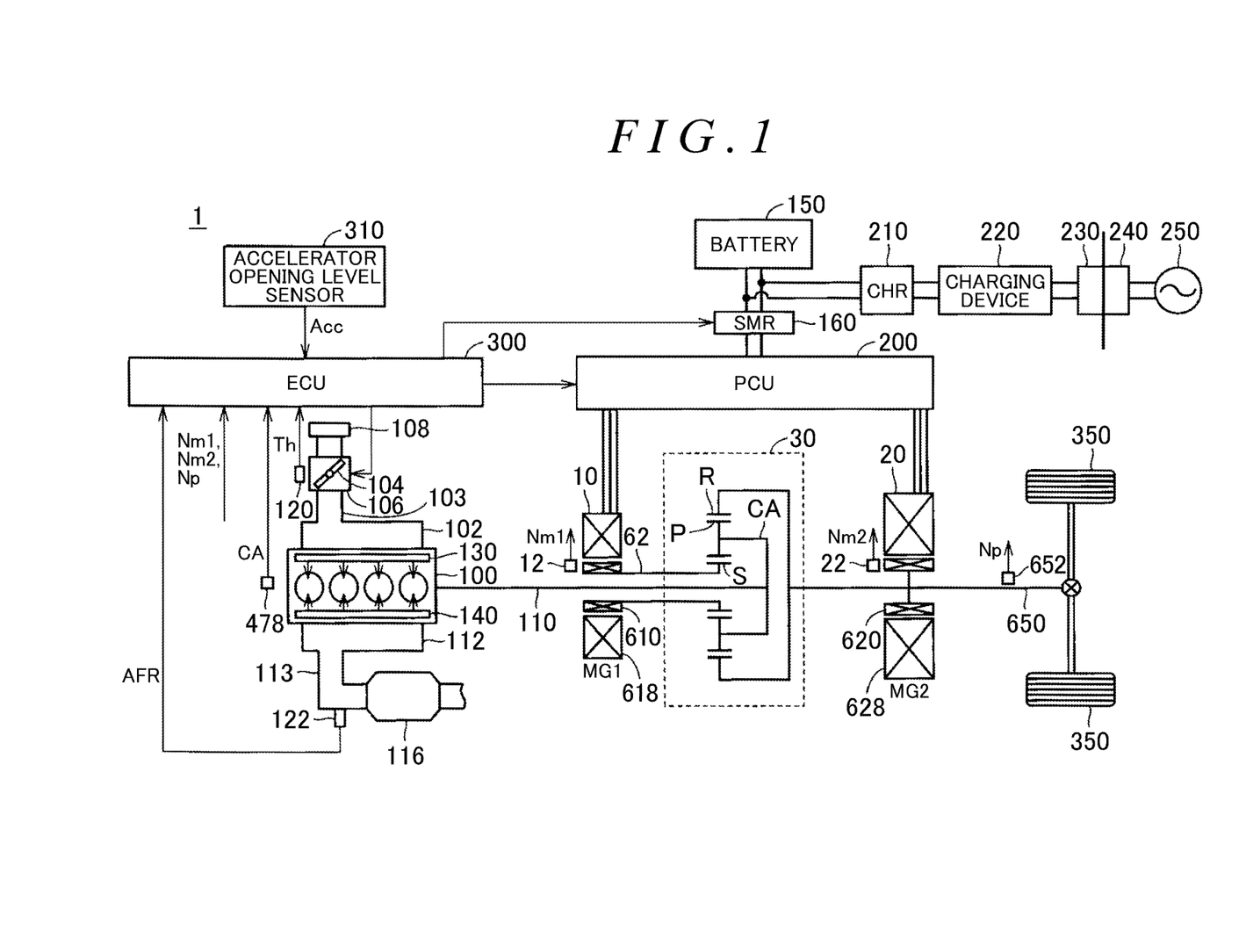
FIG. 1 is a block diagram schematically illustrating an entire configuration of a vehicle.

FIG. 1 is a block diagram schematically illustrating an entire configuration of a vehicle according to an embodiment. Referring to FIG. 1, a vehicle 1 includes an engine 100, motor generators 10 and 20, a planetary gear mechanism 30, driving wheels 350, an output shaft 650 mechanically connected to the driving wheels 350, a battery 150, a system main relay (SMR) 160, a power control unit (PCU) 200, a charging relay (hereinafter referred to as CHR) 210, a charging device 220, an inlet 230, and an electronic control unit (ECU) 300.

The vehicle 1 travels using power of at least one of the engine 100 and the motor generator 20. The vehicle 1 can switch a travel mode of the vehicle 1 between electric vehicle travel (EV travel) in which the power of the engine 100 is not used and the power of the motor generator 20 is used and hybrid vehicle travel (HV travel) in which the power of both the engine 100 and the motor generator 20 is used.

The engine 100 is an internal combustion engine such as a gasoline engine or a diesel engine. The engine 100 generates power for causing the vehicle 1 to travel in accordance with a control signal from the ECU 300. The power generated by the engine 100 is output to the planetary gear mechanism 30. The detailed configuration of the engine will be described later.

Each of the motor generators 10 and 20 is, for example, a three-phase permanent magnet type synchronous motor. The motor generator (a first motor generator: MG1) 10 includes a rotor 610 and a stator 618. The rotor 610 is mechanically connected to a sun gear shaft 62 that rotates with rotation of a sun gear S of the planetary gear mechanism 30. The motor generator (a second motor generator: MG2) 20 includes a rotor 620 and a stator 628. The rotor 620 is mechanically connected to the output shaft 650. In the example illustrated in FIG. 1, the rotor 620 of the motor generator 20 is directly connected to the output shaft 650, but the rotor 620 may be mechanically connected to the output shaft 650 via a transmission mechanism (a reduction mechanism).

The planetary gear mechanism 30 is configured to mechanically connect the engine 100, the motor generator 10, and the output shaft 650 to each other and to transmit a torque among the engine 100, the motor generator 10, and the output shaft 650. Specifically, the planetary gear mechanism 30 includes a sun gear S, a ring gear R, a carrier CA, and a pinion gear P as rotary elements. The sun gear S is connected to the rotor 610 of the motor generator 10 via the sun gear shaft 62. The ring gear R is connected to the output shaft 650. The pinion gear P engages with the sun gear S and the ring gear R. The carrier CA is connected to a crank shaft 110 of the engine 100 and holds the pinion gear P such that the pinion gear P rotates and revolves. In this way, the motor generators 10 and 20 are mechanically connected to the vehicle wheels (the driving wheels 350) via the planetary gear mechanism 30. The motor generator 20 corresponds to one example of the "rotary electrical machine connected to the driving wheels."

The battery 150 is described as a representative example of a power storage device configured to be rechargeable. The battery 150 is representatively constituted by a secondary battery such as nickel hydrogen secondary battery or a lithium ion secondary battery. A capacitor such as an electrical double layer capacitor can also be used as the power storage device. The voltage of the battery 150 is, for example, about 200 V.

The SMR 160 is connected to the battery 150 and the PCU 200. The SMR 160 switches a connection state between the battery 150 and the PCU 200 to one of a connected state (ON) and a disconnected state (OFF) in accordance with a control signal from the ECU 300.

The PCU 200 boosts DC power stored in the battery 150, converts the boosted power into AC power, and supplies the AC power to the motor generator 10 and the motor generator 20. The PCU 200 converts AC power generated by the motor generator 10 and the motor generator 20 into DC power and supplies the DC power to the battery 150.

In this way, the outputs (a torque and a rotation speed) of the motor generators 10 and 20 are controlled by the DC/AC power conversion of the PCU 200. The motor generator 10 is controlled to cause the crank shaft 110 of the engine 100 to rotate using the power of the battery 150 when the engine 100 is started. The motor generator 10 can also be controlled to generate power using the power of the engine 100. The AC power generated by the motor generator 10 is converted into DC power by the PCU 200 and the battery 150 is charged with the DC power. The AC power generated by the motor generator 10 may be supplied to the motor generator 20.

The motor generator 20 causes the output shaft 650 to rotate using at least one of the power supplied from the battery 150 and the power generated by the motor generator 10. The motor generator 20 can also generate power by regenerative braking. The AC power generated by the motor generator 20 is converted into DC power by the PCU 200. The converted DC power is used to charge the battery 150.

The CHR 210 is connected to the battery 150 and the charging device 220. The CHR 210 switches a connection state between the battery 150 and the charging device 220 to one of a connected state (ON) and a disconnected state (OFF) in accordance with a control signal from the ECU 300.

The charging device 220 is connected to the inlet 230, converts AC power supplied from the inlet 230 into DC power, and supplies the converted DC power to the battery 150. The inlet 230 has a structure to which a charging plug 240 connected to an AC power supply 250 disposed outside the vehicle 1 can be attached.

When the charging plug 240 is attached to the inlet 230, the ECU 300 turns on the CHR 210 (turns off the SMR 160), converts the AC power supplied from the AC power supply 250 into AC power using the charging device 220, and charges the battery 150 with the AC power. When the battery 150 is fully charged, the ECU 300 stops the operation of the charging device 220 and turns off the CHR 210.

Figure 2:
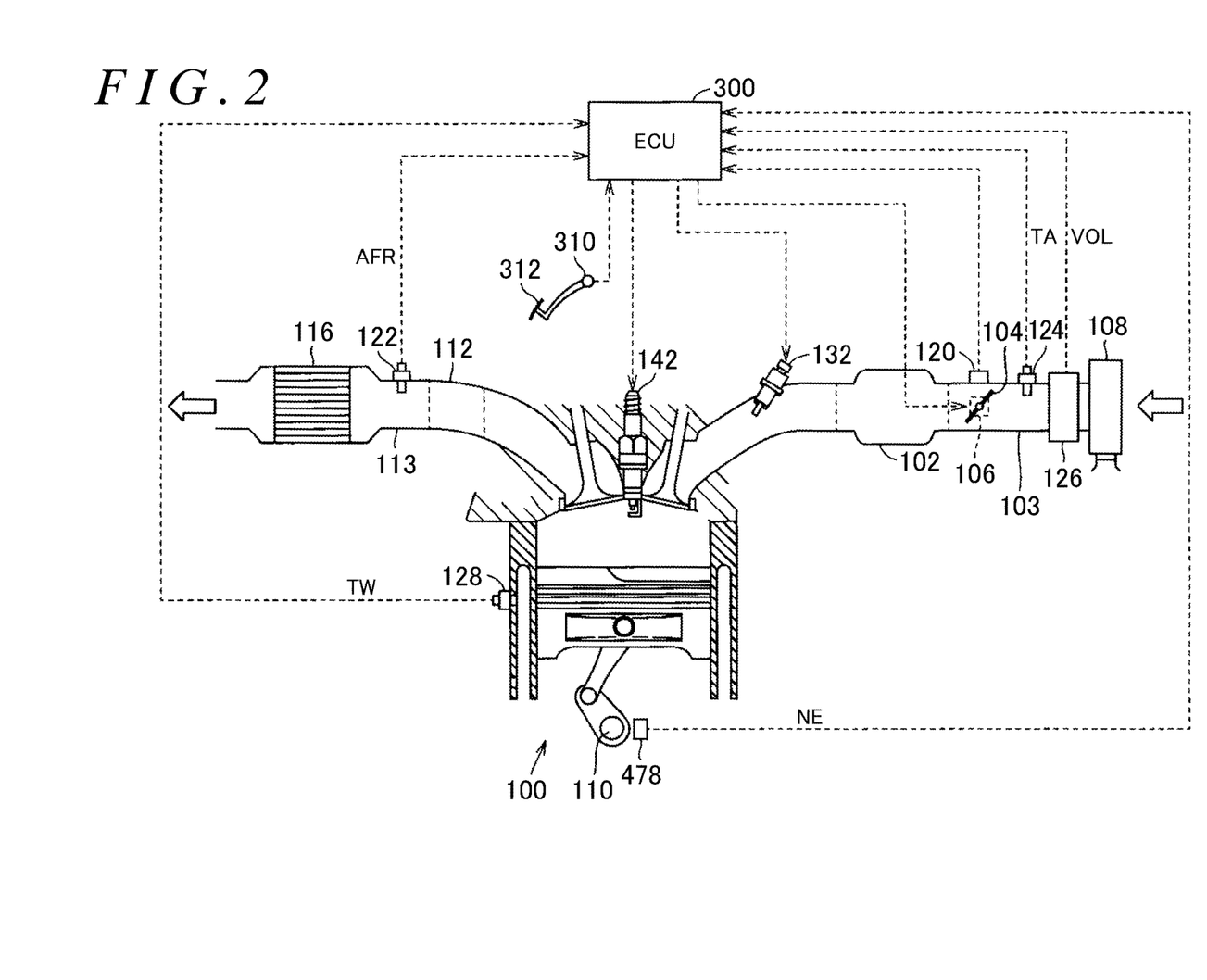
FIG. 2 is a diagram illustrating a detailed configuration of an engine illustrated in FIG. 1.

FIG. 2 is a diagram illustrating a detailed configuration of the engine 100 illustrated in FIG. 1. The engine 100 includes a plurality of cylinders (for example, four cylinders). In FIG. 2, one cylinder is representatively illustrated for the purpose of convenience of explanation.

Referring to FIGS. 1 and 2, an intake manifold 102 is disposed on an intake side of the engine 100. The intake manifold 102 includes an intake branch pipe connected to intake ports of the cylinders and a common surge tank. The surge tank is connected to one end of an intake passage 103, and an air cleaner 108 is connected to the other end of the intake passage 103. An electronic throttle 106 is disposed between one end and the other end of the intake passage 103. The electronic throttle 106 includes a throttle valve 104 that adjusts an amount of intake air and a throttle motor (not illustrated) that activates the throttle valve 104. The electronic throttle 106 is provided with a throttle opening level sensor 120.

In the electronic throttle 106, an opening level of the throttle valve 104 (hereinafter referred to as a throttle opening level) is controlled by driving the throttle motor in accordance with a control signal from the ECU 300. The ECU 300 controls an amount of intake air in the intake passage 103 by controlling the throttle opening level.

The engine 100 is provided with a fuel injecting device 130 and an ignition device 140. The fuel injecting device 130 includes a fuel injector 132 that is disposed in an intake port of each cylinder. The fuel injector 132 injects fuel into the intake port in accordance with a control signal from the ECU 300. The ECU 300 controls an amount of fuel injected into each cylinder by adjusting a fuel injection time from the fuel injector 132 to the intake port.

The ignition device 140 includes an ignition plug 142 that is disposed at the top of each cylinder. The ignition plug 142 performs ignition at an ignition timing based on a control signal from the ECU 300.

An exhaust manifold 112 is disposed on an exhaust side of the engine 100. The exhaust manifold 112 is connected to one end of an exhaust passage 113. A catalyst 116 that purifies exhaust gas is disposed in the middle of the exhaust passage 113. An air-fuel ratio sensor 122 that detects an air-fuel ratio is disposed between the intake manifold 102 and the catalyst 116.

Air suctioned from the air cleaner 108 is mixed with fuel injected from the fuel injector 132 at the intake port, and the air-fuel mixture is introduced into a combustion chamber when the intake valve is opened. When the air-fuel mixture is combusted by the ignition of the ignition plug 142 through a compression stroke, a piston is pressed down by the combustion pressure and the crank shaft 110 rotates. The gas after combustion (exhaust gas) flows into the exhaust manifold 112 via the exhaust port from the combustion chamber when the exhaust valve is opened. The exhaust gas flowing in the exhaust manifold 112 flows through the exhaust passage 113, is purified by the catalyst 116, and is then discharged from the vehicle.

The ECU 300 includes a central processing unit (CPU), a memory, and an input/output buffer, though none of these is illustrated. The ECU 300 controls various devices such that the vehicle 1 is in a desired travel state on the basis of signals from various sensors and devices and a map and a program stored in the memory. A variety of control is not limited to processing by software, but may be performed by dedicated hardware (electronic circuits). In this embodiment, it is assumed that devices included in the vehicle 1 are controlled by a unified ECU 300, but a plurality of ECUs may be combined to control the devices included in the vehicle 1.

The ECU 300 is connected to the throttle opening level sensor 120, the air-fuel ratio sensor 122, an airflow meter 124, an intake air temperature sensor 126, a coolant temperature sensor 128, a crank angle sensor 478, resolvers 12 and 22, a vehicle speed sensor 652, and an accelerator opening level sensor 310 directly or indirectly via a communication line.

The throttle opening level sensor 120 detects a throttle valve opening level Th. The air-fuel ratio sensor 122 outputs a signal indicating an air-fuel ratio AFR to the ECU 300. The airflow meter 124 detects an amount of intake air VOL. The intake air temperature sensor 126 detects a temperature of air TA flowing in the intake passage. The coolant temperature sensor 128 detects a coolant temperature TW in a water jacket (not illustrated) of the engine 100. The crank angle sensor 478 detects a rotation angle (a crank angle) CA of the crank shaft 110. The resolver 12 detects a rotation speed (an MG1 rotation speed) Nm1 of the motor generator 10. The resolver 22 detects a rotation speed (an MG2 rotation speed) Nm2 of the motor generator 20. The sensors output signals indicating detection results to the ECU 300.

The vehicle speed sensor 652 detects a rotation speed Np of the output shaft 650 and outputs a signal indicating the detection result to the ECU 300. The ECU 300 calculates a vehicle speed V on the basis of the signal from the vehicle speed sensor 652.

The accelerator opening level sensor 310 detects an opening level (an accelerator opening level) Acc of an accelerator pedal 312 (see FIG. 2) and outputs a signal indicating the detection result to the ECU 300. The ECU 300 sets a request output to the engine 100 on the basis of the accelerator opening level Acc and the vehicle speed V. The ECU 300 controls the amount of intake air, the ignition timing, the fuel injection timing, the amount of fuel injected, and the like of the engine 100 such that the engine 100 operates at an operation point (a combination of an engine speed and an engine torque) for generating the set request output depending on the travel state of the vehicle 1.

Particularly, in the engine 100, the ECU 300 performs feedback control as control of the throttle opening level (the amount of intake air) or control of the amount of fuel injected to cause the engine 100 to operate in an appropriate state.

Now, idle speed control (ISC) of the engine 100 will be described as an example of the feedback control which is performed for the control of the engine 100 in this embodiment.

Figure 3:
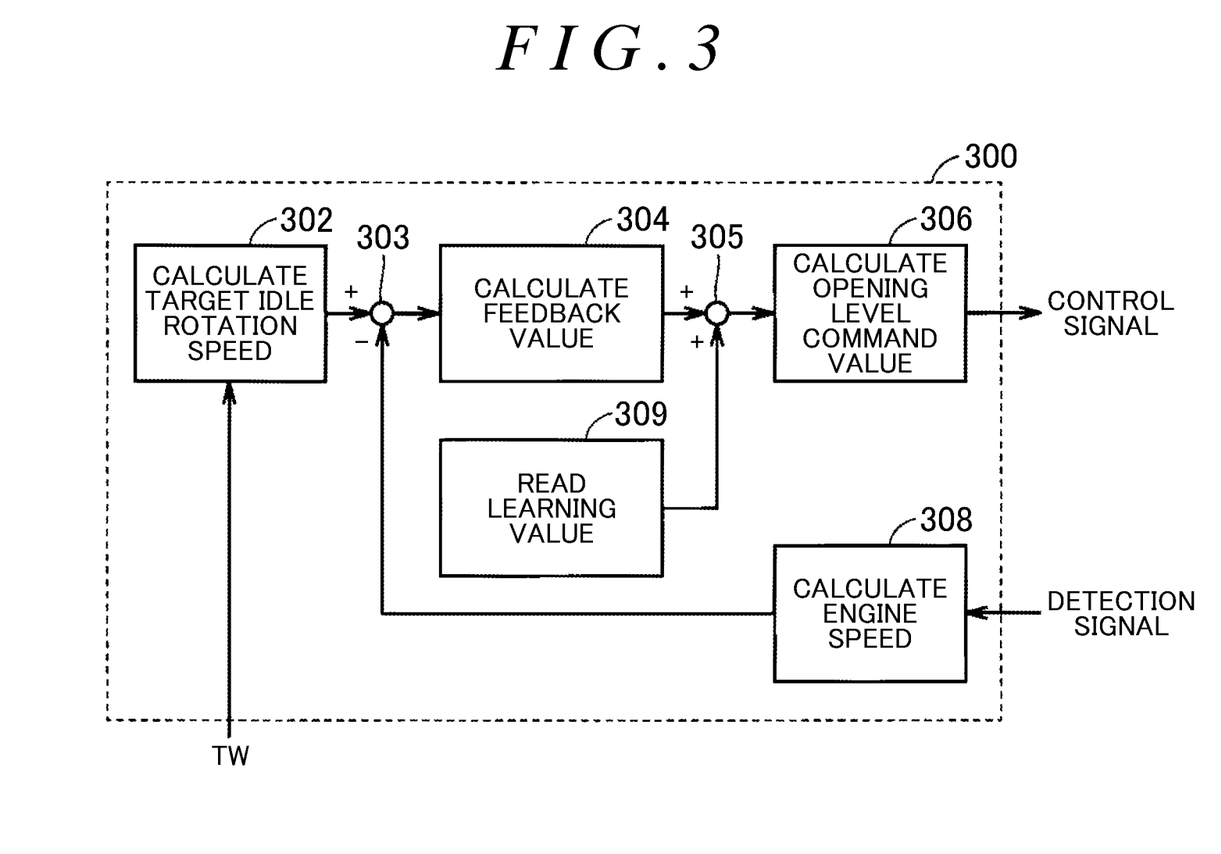
FIG. 3 is a control block diagram illustrating ISC control.

FIG. 3 illustrates an example of a control block diagram of the ISC control which is performed by the ECU 300. When the engine 100 transitions to an idle state, the ECU 300 calculates a target idle rotation speed Ne_t in Block 302. The ECU 300 calculates the target idle rotation speed Ne_t, for example, on the basis of a warm-up state of the engine 100 (that is, the coolant temperature TW).

The ECU 300 calculates a rotation speed difference (Ne_t-Ne) between the target idle rotation speed Ne_t calculated in Block 302 and the actual rotation speed Ne of the engine 100 to be calculated in Block 308 to be described later.

In Block 304, the ECU 300 calculates a feedback value FB on the basis of the calculated rotation speed difference. In the feedback value FB, an upper limit value and a lower limit value are set. Accordingly, for example, when the feedback value FB is greater than an upper limit value FBu, the ECU 300 calculates the upper limit value FBu as the feedback value FB. On the other hand, when the feedback value FB is less than a lower limit value FBl, the ECU 300 calculates the lower limit value FBl as the feedback value FB.

At an addition node 305, the ECU 300 adds a learning value L read in Block 309 to the feedback value FB calculated in Block 304. In Block 306, the ECU 300 converts a value (FB+L) obtained by adding the learning value L to the feedback value FB into a throttle opening level Thfb. The ECU 300 generates a control signal using the sum of the converted throttle opening level Thfb and the initial value Th(0) of the throttle opening level when the engine 100 is in the idle state as a command value of the throttle opening level. The ECU 300 outputs the generated control signal to the engine 100.

In Block 308, the ECU 300 calculates the actual rotation speed Ne of the engine 100 from the crank angle CA based on the detection signal from the crank angle sensor 478 and inputs the calculated actual rotation speed Ne to the addition node 303. In Block 309, the ECU 300 reads the learning value L from a storage area of the memory or the like.

The learning value L is used to correct a deviation of the degree of control of the feedback control of the engine 100 during operation of the engine 100. The ECU 300 acquires, for example, a difference between the initial value Th(0) of the throttle opening level and a convergence value of the throttle opening level when the engine 100 is set to be constant at the target idle rotation speed Ne_t (a convergence value of the feedback value when the actual rotation speed Ne of the engine 100 is set to be constant at the target idle rotation speed Ne_t) as a learning value and stores the acquired learning value in the storage area of the memory or the like.

The ECU 300 calculates the learning value L using a preset learning value when a predetermined learning start condition is satisfied.

On the other hand, the ECU 300 controls an output distribution of the engine 100 and the motor generators 10 and 20 including the intermittent operation of the engine 100 during driving of the vehicle 1, and controls the operations of the engine 100 and the motor generators 10 and 20 in accordance with an operation command based on the output distribution.

The output distribution is controlled by switching a plurality of operation modes which are different from each other in at least one condition of an engine stop condition and an engine start condition for controlling the intermittent operation of the engine 100. The plurality of operation modes include a first mode and a second mode in which the at least one condition is set such that a stop period of the engine 100 is longer than that in the first mode. In this embodiment, it is assumed that the "first mode" is a charge sustaining (CS) mode and the "second mode" is a charge depleting (CD) mode.

That is, the ECU 300 performs travel control of controlling travel of the vehicle 1 by selectively applying the CD mode and the CS mode. The ECU 300 selects one of the CD mode and the CS mode, for example, when a switch (not illustrated) disposed in a driver seat is operated by a user.

The ECU 300 may select the CD mode as an initial operation mode after a system is started and may automatically switch the operation mode to the CS mode when a state of charge (SOC) of the battery 150 is lower than a threshold value. The CD mode and the CS mode will be described below.

Figure 4:
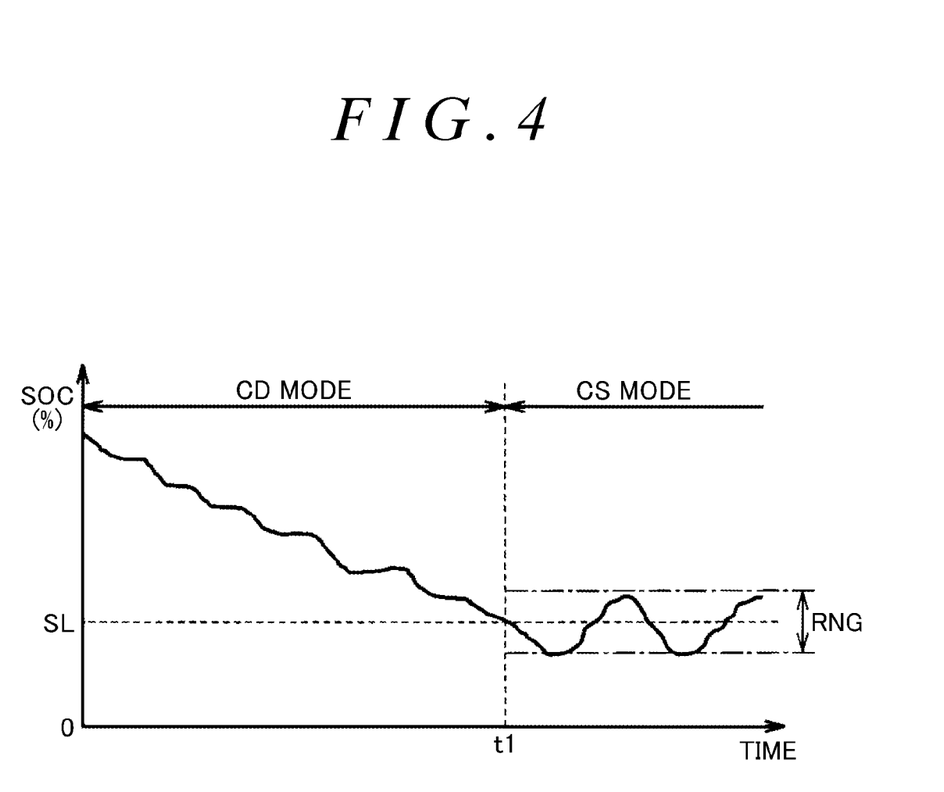
FIG. 4 is a diagram illustrating a Charge Depleting mode and a Charge Sustaining mode.

FIG. 4 is a diagram illustrating the CD mode and the CS mode. Referring to FIG. 4, for example, it is assumed that travel is started in the CD mode after the battery 150 is fully charged by external charging.

The CD mode is a mode in which the SOC is consumed and power stored in the battery 150 (electric energy mainly based on external charging) is basically consumed. That is, the CD mode is a mode in which a decrease in the SOC is permitted. At the time of operation in the CD mode, the engine 100 does not operate to maintain the SOC. Accordingly, the SOC may temporarily increase due to regenerated power recovered at the time of deceleration of the vehicle 1 or the like or power generated with the operation of the engine 100, but as a result, a discharging ratio becomes larger than a charging ratio and the SOC decreases with an increase in travel distance as a whole.

The CS mode is a mode in which the SOC is maintained at a predetermined level. For example, at time t1, when the SOC decreases to a predetermined value SL indicating a decrease in the SOC, the CS mode is selected and then the SOC is controlled to be within a control range RNG. That is, the CS mode is a mode in which the decrease in the SOC below the lower limit of the control range RNG is not permitted. Specifically, the engine 100 operates when the SOC reaches the lower limit of the control range RNG (an engine start threshold value), and the engine 100 stops when the SOC reaches the upper limit of the control range RNG. In this way, by appropriately repeating the operation and the stop of the engine 100 (intermittent operation), the SOC is controlled to be within the control range RNG. In this way, in the CS mode, the engine 100 operates to maintain the SOC.

In the CD mode, the engine 100 operates when a large travel driving force is required. On the other hand, in the CS mode, the engine 100 stops when the SOC increases. That is, the CD mode is not limited to the EV travel in which the vehicle travels in a state in which the engine 100 stops normally, and the CS mode is not limited to the HV travel in which the vehicle travels in a state in which the engine 100 operates normally. The EV travel and the HV travel are possible in the CD mode and the CS mode.

In the vehicle 1 having the above-mentioned configuration, the engine 100 may stop intermittently during driving of the vehicle 1 for the purpose of improvement in fuel efficiency when the CD mode or the CS mode is selected. When the engine 100 stops intermittently, the above-mentioned learning of the feedback control of the engine 100 cannot be performed. Accordingly, it is necessary to cause the engine 100 to operate such that the improvement in fuel efficiency and the performing of learning are compatible.

However, the CD mode and the CS mode have different degrees to which the intermittent operation of the engine is permitted. Accordingly, when the learning control is performed in the same way in both operation modes, the engine may not stop in the CD mode until the learning is completed. Accordingly, in a situation in which the intermittent operation is required by a user such as a case in which the CD mode in which the intermittent operation (intermittent stop) of the engine is further permitted is selected by the user, the operating state of the engine may be maintained. As a result, there is a possibility of deterioration in fuel efficiency or deterioration in drivability.

Therefore, in this embodiment, the ECU 300 calculates a learning value for correcting a deviation of the degree of control of the feedback of the engine 100 using a first learning time when the engine 100 operates in the CS mode. On the other hand, it is assumed that the ECU 300 calculates a learning value using a second learning time shorter than the first learning time when the engine 100 operates in the CD mode.

In the CD mode, the engine is likely to stop. Accordingly, by calculating the learning value using the second learning time shorter than the first learning time, it is possible to suppress the operating state of the engine from being maintained by the learning when the operating state of the engine 100 is maintained until the learning is completed.

Figure 5:
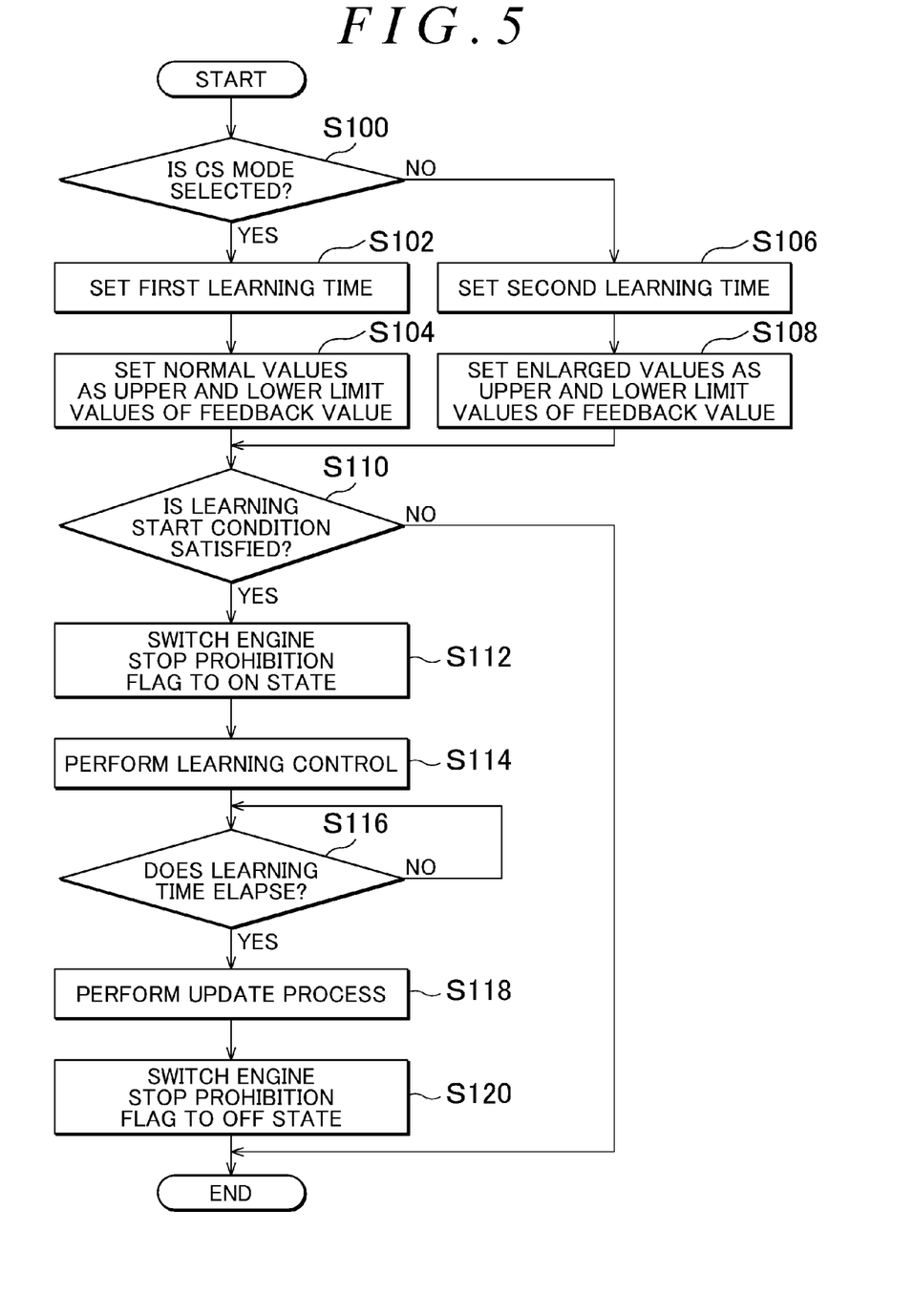
FIG. 5 is a flowchart illustrating a control process which is performed by an ECU.

FIG. 5 is a flowchart illustrating a flow of a control process which is performed by the ECU 300 in this embodiment.

In Step (hereinafter, "Step" is referred to as "S") 100, the ECU 300 determines whether the CS mode is selected. The ECU 300 determines whether the CS mode is selected, for example, on the basis of a flag which is turned on whenever the CS mode is selected. When it is determined that the CS mode is selected (YES in S100), the process flow moves to S102. In S102, the ECU 300 sets the first learning time.

In S104, the ECU 300 sets normal values as the upper limit value FBu and the lower limit value FBl of the feedback value FB.

On the other hand, when it is determined in S100 that the CS mode is not selected (NO in S100), the ECU 300 sets the second learning time in S106.

In S108, the ECU 300 sets enlarged values as the upper limit value FBu and the lower limit value FBl of the feedback value FB. The ECU 300 sets values obtained by changing at least one of the upper limit value FBu and the lower limit value FBl of the feedback value FB to enlarge the change range of the feedback value FB in comparison with the case in which the engine 100 operates in the CS mode as the enlarged values. This is because the accuracy of the learning value may be lowered and the feedback value FB may be changed when the second learning time is set to be shorter than the first learning time.

In S110, the ECU 300 determines whether a learning start condition is satisfied. Examples of the learning start condition include a condition in which warming-up of the engine 100 is completed a condition in which the engine 100 is in the idle state, and a condition in which the ratio of the feedback value FB in the sum of the feedback value FB and the learning value L when the actual rotation speed Ne of the engine 100 is equal to the target idle rotation speed Ne_t is equal to or greater than a threshold value. The learning start condition is not particularly limited to the examples. When it is determined that the learning start condition is satisfied (YES in S110), the process flow moves to S112.

In S112, the ECU 300 switches an engine stop prohibition flag to an ON state. The ECU 300 suppresses stopping of the engine 100 while the engine stop prohibition flag is in the ON state.

In S114, the ECU 300 performs learning control. That is, the ECU 300 calculates the learning value until the learning time set in S102 or S106 elapses.

For example, the ECU 300 calculates the sum of the previous learning value L and the convergence value of the feedback value FB when a converging state in which the rotation speed difference between the target idle rotation speed Ne_t and the actual rotation speed Ne of the engine 100 is less than a threshold value is maintained for a predetermined time as a current learning value L.

In S116, the ECU 300 determines whether the set learning time elapses. When it is determined that the set learning time elapses (YES in S116), the process flow moves to S118.

In S118, the ECU 300 performs an update process of updating the learning value stored in the storage area of the memory or the like. For example, when the current learning value L is calculated until the set learning time elapses, the ECU 300 updates the learning value using the calculated current learning value L. When the set learning time elapses before the converging state is maintained for the predetermined time, the ECU 300 updates the learning value using the sum of the feedback value FB at the time point at which the set learning time elapses and the previous learning value L. In S120, the ECU 300 switches the engine stop prohibition flag to an OFF state. When it is determined that the learning start condition is not satisfied (NO in S110), the ECU 300 ends the process flow.

Figure 6:
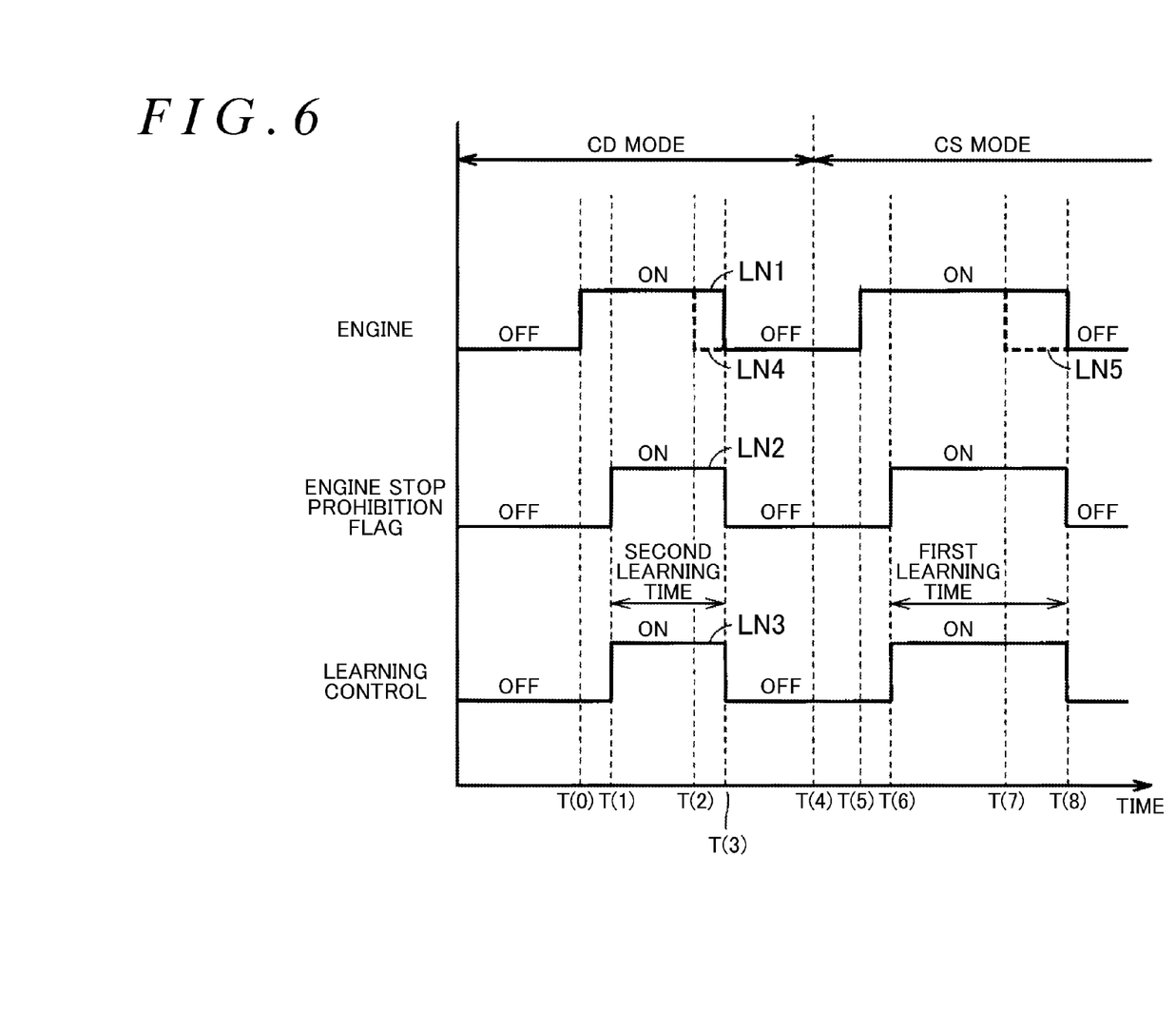
FIG. 6 is a timing chart illustrating an operation of the ECU.

The operation of the ECU 300 mounted on the vehicle 1 according to this embodiment based on the above-mentioned structure and flowchart will be described below with reference to FIG. 6. For example, it is assumed that the CD mode is selected and the engine 100 is in the OFF state. The vertical axis in FIG. 6 represents the operating state of the engine 100, the state of the engine stop prohibition flag, and the performing state of the learning control. The horizontal axis in FIG. 6 represents time.

When the CD mode is selected (NO in S100), the second learning time is set (S106). At this time, enlarged values are set as the upper limit value FBu and the lower limit value FBl of the feedback value FB (S108).

At time T(0), when the CD mode is selected and a large travel driving force is required, the engine 100 is started as indicated by line LN1 in FIG. 6. At time T(1), when the learning start condition is satisfied (YES in S110), the engine stop prohibition flag is switched to the ON state as indicated by line LN2 in FIG. 6 (S112) and the learning control is performed as indicated by line LN3 in FIG. 6 (S114).

Accordingly, at time T(2), even when a large travel driving force is not required and the stop condition of the engine 100 is satisfied, the engine stop prohibition flag is in the ON state and thus the operating state of the engine 100 is maintained. Dotted line LN4 indicates that the operation of the engine 100 is stopped at time T(2), when the learning start condition is not satisfied (NO in S110).

At time T(3), when the set learning time (the second learning time) elapses (YES in S116), the learning control ends as indicated by line LN3 in FIG. 6 and the update process is performed (S118). Then, the engine stop prohibition flag is switched to the OFF state as indicated by line LN2 in FIG. 6 (S120). Accordingly, the operation of the engine 100 is stopped as indicated by line LN1 in FIG. 6.

At time T(4), when the operation mode is switched from the CD mode to the CS mode (YES in S100), the first learning time is set (S102). At this time, normal values are set as the upper limit value FBu and the lower limit value FBl of the feedback value FB (S106).

At time T(5), when the CS mode is selected and the SOC is less than a predetermined value SL or a large travel driving force is required, the engine 100 is started as indicated by line LN1 in FIG. 6. At time T(6), when the learning start condition is satisfied (YES in S110), the engine stop prohibition flag is switched to the ON state as indicated by line LN2 in FIG. 6 (S112) and the learning control is performed as indicated by line LN3 in FIG. 6 (S114).

Accordingly, at time T(7), for example, even when the SOC is recovered and the stop condition of the engine 100 is satisfied, the engine stop prohibition flag is in the ON state and thus the operating state of the engine 100 is maintained. Dotted line LN5 in FIG. 6 indicates that the operation of the engine 100 is stopped at time T(7), when the learning start condition is not satisfied (NO in S110).

At time T(8), when the set learning time (the first learning time) elapses (YES in S116), the learning control ends as indicated by line LN3 in FIG. 6 and the update process is performed (S118). Then, the engine stop prohibition flag is switched to the OFF state as indicated by line LN2 in FIG. 6 (S120). Accordingly, the operation of the engine 100 is stopped as indicated by line LN1 in FIG. 6.

When the engine operates in the CD mode, the second learning time shorter than the first learning time is set. Accordingly, an operation duration time of the engine 100 from the time point (time T(2)) at which the engine 100 stops when the learning control is not performed in the CD mode to the time point (time T(3)) at which the learning control ends is shorter than the operation duration time of the engine 100 from the time point (time T(7)) at which the engine 100 stops when the learning control is not performed in the CS mode to the time point (time T(8)) at which the learning control ends.

As described above, in the hybrid vehicle according to this embodiment, the engine 100 is likely to stop in the CD mode. Accordingly, by calculating the learning value using the second learning time shorter than the first learning time, it is possible to suppress the operating state of the engine 100 from being maintained by the learning even when the operating state of the engine 100 is maintained until the learning is completed. As a result, it is possible to provide a hybrid vehicle that can appropriately calculate the learning value while controlling the engine depending on the operation mode of the vehicle.

When the engine 100 operates in the CD mode, at least one of the upper limit value and the lower limit value of the feedback value FB is changed such that the change range of the feedback value FB serving as a degree of control is enlarged in comparison with the case in which the engine 100 operates in the CS mode.

When the learning value is calculated using the second learning time shorter than the first learning time, the accuracy of the learning value may be lower than that in a case in which the learning value is calculated using the first learning time.

Figure 7:
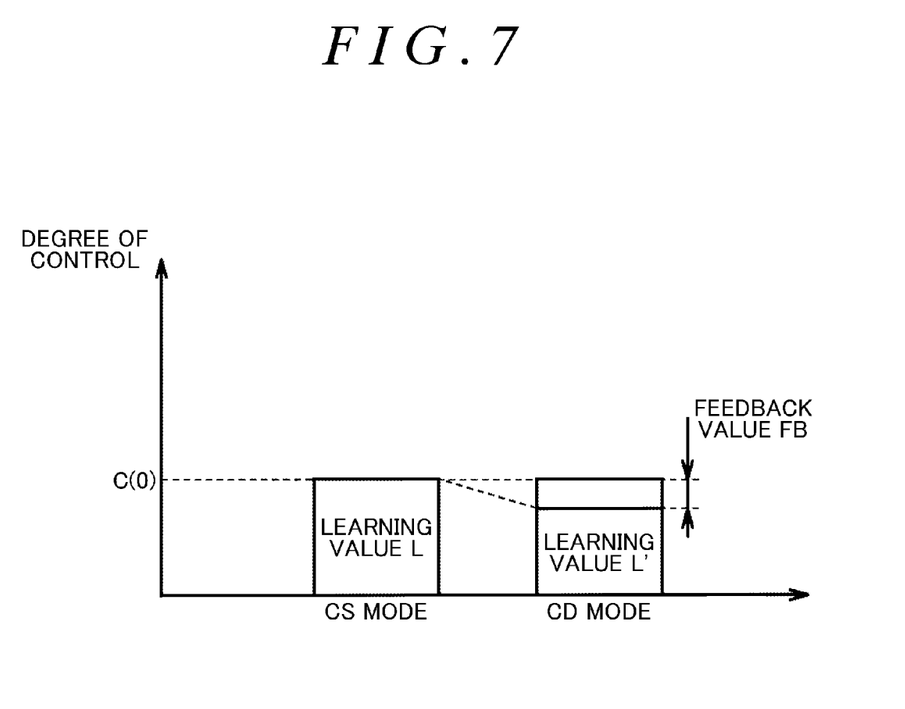
FIG. 7 is a diagram illustrating an effect of enlargement of a change range of a feedback value.

For example, as illustrated in FIG. 7, when it is assumed that a degree of control of the throttle opening level when the rotation speed difference between the target idle rotation speed Ne_t and the actual rotation speed Ne of the engine 100 is less than the threshold value is C(0) and the learning value L is calculated using the first learning time in the CS mode, the feedback value is zero.

On the other hand, when a learning value L' lower than the learning value L is calculated using the second learning time in the CD mode, a rotation speed difference is generated between the target idle rotation speed Ne_t and the actual rotation speed Ne of the engine 100. Accordingly, the feedback value FB may be changed to remove the rotation speed difference. Accordingly, it is possible to appropriately control the engine 100 to cope with the change of the feedback value FB by enlarging the change range of the feedback value FB. Accordingly, it is possible to suppress deterioration in drivability and deterioration in fuel efficiency.

The vehicle 1 has a configuration in which the battery 150 can be charged using the AC power supply 250 outside the vehicle 1, and the SOC of the battery 150 may be higher due to the charging using the AC power supply 250 when the vehicle 1 starts traveling. In this case, there is a high chance of a user selecting the CD mode in the vehicle 1. Accordingly, by setting the above-mentioned second learning time for the vehicle 1, it is possible to further suppress deterioration in drivability and deterioration in fuel efficiency.

Modified examples will be described below. In this embodiment, the disclosure is applied to a case in which the stop of the engine 100 is prohibited during performing of the learning control, but the disclosure may be applied to, for example, a case in which the learning control is stopped to stop the engine 100 when the stop condition of the engine 100 is satisfied during performing of the learning control.

In the CD mode, the operation time of the engine 100 is likely to be shorter than that in the CS mode. Accordingly, by setting the second learning time shorter than the first learning time as the learning time of the learning control in the CD mode, it is possible to suppress a decrease in opportunities to perform the learning control. As a result, it is possible to provide a hybrid vehicle that can appropriately calculate the learning value while controlling the engine depending on the operation mode of the vehicle.

In this embodiment, the difference between the initial value Th(0) of the throttle opening level and the convergence value of the throttle opening level when the engine 100 is set to be constant at the target idle rotation speed Ne_t (the convergence value of the feedback value when the actual rotation speed Ne of the engine 100 is set to be constant at the target idle rotation speed Ne_t) is calculated as the learning value, but following learning methods may be performed as the learning method.

For example, the ECU 300 maintains a state in which the difference between the target idle rotation speed Ne_t and the actual rotation speed Ne of the engine 100 is less than a threshold value. The ECU 300 adds a predetermined value to the previous learning value L whenever a predetermined time elapses until the ratio of the feedback value FB in the sum of the feedback value FB and the learning value L reaches a predetermined ratio (for example, zero) in this state. The ECU 300 may set the learning value at that time as the current learning value when the ratio of the feedback value FB reaches the predetermined ratio before the set learning time elapses, and may set the learning value at the time point at which the set learning time elapses as the current learning value when the set learning time elapses before the ratio of the feedback value FB reaches the predetermined ratio.

In this embodiment, the learning value at the time point at which the learning time elapses is set as the current learning value when the learning time elapses, but, for example, the learning value may not be updated (that is, the previous learning value may be maintained) when the learning time elapses.

In this embodiment, the ISC control is described as an example of the feedback control which is performed by the engine 100, but the feedback control is not particularly limited to the ISC control. For example, the disclosure may be applied to air-fuel ratio control or ignition timing control. For example, the disclosure may be applied to a case in which an amount of fuel injected is controlled in a feedback manner such that an actual air-fuel ratio detected by the air-fuel ratio sensor 122 reaches a target air-fuel ratio of the engine 100. That is, the learning time of the learning value when the learning value is added to the feedback value based on the difference between the target air-fuel ratio and the actual air-fuel ratio to correct the deviation of the degree of control may be switched depending on the operation mode as described above.

In this embodiment, the operation mode includes the CS mode and the CD mode, but the operation mode is not particularly limited to the CS mode and the CD mode as long as different learning times are set in a first mode and a second mode having an engine start condition or an engine stop condition which is set to increase the stop period of the engine more than that in the first mode.

For example, different learning times may be set in the CD mode and a special CD mode having an engine start condition or an engine stop condition which is set to increase the stop period of the engine 100 more than in the CD mode as the operation modes. For example, the special CD mode is a mode in which the engine 100 is stopped except for the time of full opening or when a driving force corresponding to the full opening is required and the engine 100 is started only at the time of full opening or when a driving force corresponding to the full opening is required.

In this embodiment, the operation modes include two modes, but three or more modes may be included. That is, different learning times may be set in a first mode of the three or more modes and a second mode having an engine start condition or an engine stop condition which is set to increase the stop period of the engine more than that in the first mode.

In this embodiment, the hybrid vehicle having a configuration in which the battery 150 can be charged using the external AC power supply 250 is described as an example, but the disclosure may be applied to a hybrid vehicle not having such a configuration.

A part or all of the above-mentioned modified examples may be appropriately combined in practice. It should be understood that the embodiment disclosed herein is exemplary in all aspects and not restrictive. The scope of the disclosure is defined by the appended claims, not by the above description, and it is intended to include all modifications within meanings and scopes of the claims.

What is claimed is:

1. A control device for a hybrid vehicle, the hybrid vehicle including
an engine, and
a motor connected to a driving wheel,
the control device comprising
an electronic control unit configured to:
control an output distribution of the engine and the motor including intermittent operation of the engine during travel of the vehicle;
control operations of the engine and the motor in accordance with an operation command based on the output distribution, the output distribution being controlled by switching a plurality of modes, the plurality of modes including a first mode and a second mode, the first mode and the second mode being different from each other in at least one condition of an engine stop condition and an engine start condition for controlling the intermittent operation of the engine, the at least one condition of the second mode being set such that a stop period of the engine in the second mode is longer than a stop period of the engine in the first mode;
calculate a first learning value when the engine is operated in the first mode, the first learning value is a learning value for correcting a deviation in a degree of control of feedback control of the engine using a first learning time, and
calculate a second learning value using a second learning time when the engine is operated in the second mode, the second learning time being shorter than the first learning time.

2. The control device according to claim 1, wherein
the electronic control unit is configured to change at least one of an upper limit value and a lower limit value of the degree of control such that a change range of the degree of control when the engine is operated in the second mode is greater than a change range of the degree of control when the engine operates in the first mode.

3. The control device according to claim 1, wherein
the electronic control unit is configured to calculate the first learning value and the second learning value based on a throttle opening level of the engine.

4. A control method for a hybrid vehicle, the hybrid vehicle including
an engine,
a motor connected to a driving wheel, and
an electronic control unit,
the control method comprising:
controlling, by the electronic control unit, an output distribution of the engine and the motor including intermittent operation of the engine during travel of the vehicle;
controlling, by the electronic control unit, operations of the engine and the motor in accordance with an operation command based on the output distribution, the output distribution being controlled by switching a plurality of modes, the plurality of modes including a first mode and a second mode, the first mode and the second mode being different from each other in at least one condition of an engine stop condition and an engine start condition for controlling the intermittent operation of the engine, the at least one condition of the second mode being set such that a stop period of the engine in the second mode is longer than a stop period of the engine in the first mode;

calculating, by the electronic control unit, a first learning value when the engine is operated in the first mode, the first learning value is a learning value for correcting a deviation in a degree of control of feedback control of the engine using a first learning time, and calculating, by the electronic control unit, a second learning value using a second learning time when the engine is operated in the second mode, the second learning time being shorter than the first learning time.

5. The control method according to claim 4, wherein changing, by the electronic control unit, at least one of an upper limit value and a lower limit value of the degree of control such that a change range of the degree of control when the engine is operated in the second mode is greater than a change range of the degree of control when the engine operates in the first mode.

6. The control method according to claim 4, wherein calculating, by the electronic control unit, the first learning value and the second learning based on a throttle opening level of the engine.

* * * * *